United States Patent [19]

Crutchfield et al.

[11] 4,140,676

[45] Feb. 20, 1979

[54] PROCESS FOR PREPARING POLYMERIC ACETAL CARBOXYLATE SALTS

[75] Inventors: Marvin M. Crutchfield, St. Louis; Charles J. Upton, Ballwin, both of Mo.

[73] Assignee: Monsanto Company, St. Louis, Mo.

[21] Appl. No.: 882,843

[22] Filed: Mar. 2, 1978

[51] Int. Cl.$^2$ .............................................. C08G 2/30
[52] U.S. Cl. .................... 528/231; 528/489; 528/239; 528/270; 562/518; 562/537
[58] Field of Search .................. 260/67 R, 535 P; 528/489

[56] References Cited

U.S. PATENT DOCUMENTS

| | | | |
|---|---|---|---|
| 3,214,410 | 10/1965 | Koral | 260/67 R |
| 3,215,675 | 11/1965 | Koral | 260/67 R |
| 3,704,320 | 11/1972 | Lannert | 260/535 P X |
| 3,825,498 | 7/1974 | Altenschopfer et al. | 260/67 UA X |

OTHER PUBLICATIONS

Achmatowicz et al., Chemii Ann. Soc. Chim. Polonorum, 42(1968) pp. 453 and 456.

Primary Examiner—Lucille M. Phynes
Attorney, Agent, or Firm—S. M. Tarter; E. P. Grattann; F. D. Shearin

[57] ABSTRACT

Alkali metal salts of polymeric acetal carboxylate are stable detergent builders under laundry use conditions but depolymerize in acid media, making the polymer fragments more readily biodegradable in waste streams. According to the improved process of the present invention, an ester of a polymeric acetal carboxylate is brought together in a reaction zone with a sufficient amount of an alkali metal base having a normality of at least 5 normal, and preferably at least 10 normal, to saponify at least 50 percent of the ester groups. In the preferred embodiment, the ester is contacted with a solvent to remove color-producing impurities.

17 Claims, No Drawings

PROCESS FOR PREPARING POLYMERIC ACETAL CARBOXYLATE SALTS

BACKGROUND OF THE INVENTION

This invention relates to a method for preparing novel polymeric acetal carboxylates useful as complexing agents and detergency builders.

The property possessed by some materials of improving detergency levels of soaps and synthetic detergents and the use of such materials in detergent compositions is known. Such cleaning boosters are called "builders" and such builders permit the attainment of better cleaning performance than is possible when so-called unbuilt compositions are used. The behavior and mechanisms by which builders perform their function are only partially understood. It is known that good builders must be able to sequester most of the calcium and/or magnesium ions in the wash water since these ions are detrimental to the detergency process. However, it is difficult to predict which class of compounds possess useful combinations of builder properties and which compounds do not because of the complex nature of detergency and the countless factors which contribute both to overall performance results and the requirements of environmental acceptability.

Sodium tripolyphosphate (STP) has been found to be a highly efficient cleaning and detergent builder and this compound has been widely used for decades in cleaning and detergent formulations. Indeed, millions of pounds of STP are used each year in cleansing formulations because of its superior builder qualities. However, because of the recent emphasis on removing phosphates from detergent and cleaning compositions for environmental reasons, the detergent and cleaning industry is now looking for materials suitable for use as builders which do not contain phosphorus, and which are environmentally acceptable.

Such a material and its use in detergent compositions has been disclosed in copending applications Ser. Nos. 826,424 filed Aug. 22, 1977, 826,426 filed Aug. 19, 1977 and 826,425 filed Aug. 22, 1977. A preferred method for making such polymeric acetal carboxylates is disclosed in application Ser. No. 844,566 filed Nov. 21, 1977. The polymeric acetal carboxylate salts described in the above applications were tested for sequestration function using the procedures described by Matzner et al. in "Organic Builder Salts as Replacements for Sodium Tripolyphosphate", TENSIDE DETERGENTS, 10, No. 3, pages 119-125 (1973). The sequestration of calcium ions and magnesium ions as a percent of STP performance as a function of the number of repeating acetal carboxylate units showed that when the polymeric acetal carboxylate salts averaged 130 repeating units, the polymeric salt had a performance of 172 percent of STP. Thus, such polymeric acetal carboxylate salts were found to be superior detergent builders and were stable under home laundry use conditions, but depolymerized at lower pH, making them more readily biodegradable.

Although satisfactory performance was achieved using the polymeric acetal carboxylates prepared by the procedures described in the above-identified applications, the polymeric acetal carboxylate prepared by such procedures frequently required as much as 24 hours to saponify the ester of the polymeric acetal carboxylate to the corresponding alkali metal salt. Furthermore, the metal salt frequently was discolored due to impurities formed during the preparation of the polymeric acetal carboxylate.

Now, according to the present process, the polymeric acetal carboxylate ester can be saponified to the corresponding alkali metal salt in less than two hours and by the preferred procedure of the process of the present invention, the impurities which caused some discoloration in the resulting polymeric alkali metal salt can be removed. Thus, the resulting polymeric acetal carboxylate salt can be provided in higher purity that is more esthetically appealing and in a much shorter time than the methods used in the above-identified applications.

SUMMARY OF THE INVENTION

These and other advantages are achieved in a process for saponifying a polymeric acetal carboxylate ester to a polymeric acetal carboxylate salt, the improvement which comprises bringing together in a reaction zone the polymeric acetal carboxylate ester and a sufficient amount of an alkali metal base having a normality of at least 5 normal to saponify at least 50 percent of the ester groups.

For the purposes of this invention, the term "rapid depolymerization in alkaline solution" as it is used in the specification and claims shall mean that in an aqueous solution of 0.5 molar sodium hydroxide containing 10 grams per liter of polymeric acetal carboxylate, the average chain length of the polymeric acetal carboxylate will be reduced by more than 50 percent, as determined by Proton Magnetic Resonance (PMR), after 1 hour at 20° C.

Broadly described, the polymeric acetal carboxylates can be prepared by converting a hemi-acetal ester of glyoxylic acid to the corresponding aldehyde ester, and polymerizing the aldehyde ester using a polymerization initiator to form the polymeric acetal carboxylate ester. Optionally, the polymeric ester is contacted with a solvent that is immiscible with the polymeric ester to remove color-producing impurities. Thereafter, the polymeric ester is saponified to the corresponding polymeric alkali metal salt by bringing together in a reaction zone the polymeric ester and an alkali metal base having a normality of at least 5 normal.

Any number of esters of glyoxylic acid can be used to prepare the polymers of the present invention. Such esters can be made by the reaction of an alcohol containing from 1 to 4 carbon atoms with an acid hemiacetal or acid hydrate having from 1 to 4 carbon atoms under conditions known to those skilled in the art. Thereafter, the ester hemi-acetal can be converted to the corresponding aldehyde ester by any number of techniques known to those skilled in the art, such as the reaction of the ester hemi-acetal with phosphorus pentoxide. The product of the above reaction is then polymerized using a polymerization initiator in accordance with the following general equation:

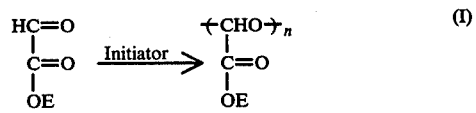

where E is an alkyl group having 1 to 4 carbon atoms and n averages at least 4.

In the event that both ends of the polymer are not stabilized against rapid depolymerization in alkaline solution, the unstabilized end of the resulting polymer can be reacted with a reagent which produces a chemically stable end group to stabilize the remaining end of the polymer against rapid depolymerization in alkaline solution to provide a polymer having the general formula:

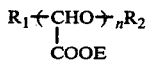

where $R_1$ and $R_2$ are end groups to stabilize the polymer against rapid depolymerization in alkaline solution.

Any number of alkali metal, i.e., sodium, potassium or lithium, derivatives can be used to initiate the reaction, which may add a chemically stable group to at least one end of the polymer. The specific nature of the end group is not important in the proper function of the polymeric salt as a builder, but it is preferred to provide end groups containing oxygen, and even more preferred to provide end groups containing carboxyl groups. As will occur to those skilled in the art in light of the present disclosure, the initiators of the present invention can be prepared by a number of techniques, such as reacting an alkali metal hydride or hydroxide in a solvent, e.g., tetrahydrofuran, with a compound that will form the corresponding end groups. Particularly suitable initiators include the lithio, sodio or potassio derivatives of: alcohols, such as methanol, ethanol, propanol, cyclohexanol, alkali metal phenates, and the like; and especially alkyl substituted esters of carboxylic acids such as acetates, adipates, benzoates, butyrates, caprates, citrates, lactates, maleates, malonates, salicylates, succinates, tannates, tartrates and the like. Initiators such as diethyl sodiomalonate and diethyl sodiomethylmalonate are especially preferred.

Any number of chemically reactive groups can be added to the unstabilized end of the polymer to stabilize the polymer against rapid depolymerization in an alkaline solution. As an example, moieties that provide suitable chemically stable end groups include: alkyl groups, such as methyl, ethyl, tertiary butyl, and the like. Other suitable end groups include carboxylic acids such as

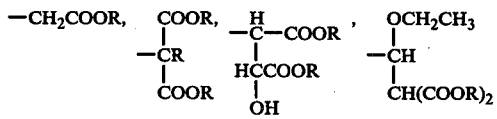

and the like; and aldehydes, ethers and other oxygen-containing alkyl groups such as

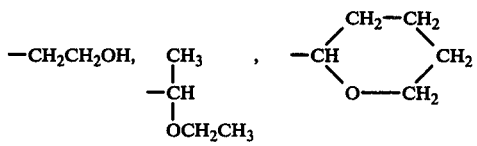

and the like. In the above examples of suitable end groups, R is hydrogen or alkyl group of 1 to 8 carbon atoms. As will occur to those skilled in the art in light of the present disclosure, the chemically stable end groups at the polymer termini can be alike or unlike.

The number of repeating units, i.e., the average value of n, in the polymeric acetal carboxylate is important since the effectiveness of the polymeric salt as a chelant, sequestrant and cleaning and detergency builder is affected by the average chain length. Even when the polymer averages four repeating units (i.e., n averages 4), the polymeric salt shows some effectiveness as a sequestrant, chelating agent and builder. Although there is no upper limit to the desired number of repeating units, which may average as high as 400, or even higher, there does not seem to be an advantage to having a polymeric salt with an average of more than about 200 repeating units. When the average number of repeating units exceeds about 100, significant improvement in sequestration, chelation and builder properties is not observed. Thus, it is preferred that the polymeric salt made by the present process contain an average between about 10 and about 200 units, and even more preferred that the polymeric salt contains an average between about 50 and about 100 repeating units in the polymer chain.

In the process of the present invention, the polymeric acetal carboxylate ester is saponified to the corresponding polymeric alkali metal salt by bringing together in a reaction zone the polymeric ester and a sufficient amount of an alkali metal base having a normality of at least 5 normal to saponify at least 50 percent of the ester groups (i.e., to convert at least half of the ester groups to carboxylic acid salts of an alkali metal). The alkali metal bases which are suitable for use in the process of the present invention are those that are known to those skilled in the art. Alkali metal hydroxides are preferred, such as lithium hydroxide, sodium hydroxide, potassium hydroxide, and mixtures thereof. Sodium hydroxide is especially preferred.

The concentration and amount of the alkali metal base is critical in the process of the present invention. The amount of base should be sufficient to saponify at least 50 percent of the ester groups, and preferably more, say at least 80 percent, since the effectiveness of the polymeric salt increases as the degree of saponification increases. Clearly, a stoichiometric amount of the alkali metal base should be used to saponify substantially all of the ester groups in the polymeric acetal carboxylate ester to the corresponding alkali metal salt to obtain the maximum usefulness of the salt as a chelant, sequestrant and detergent builder. It is preferred to use an excess, say 10 molar percent over the required stoichiometric amount, to insure that substantially all (i.e., greater than 95 percent) of the ester groups are saponified. Larger amounts, say 100 molar percent over the required stoichiometric amount, or even higher, can be used, but such large excesses do not seem to provide a benefit, although the presence of such large amounts of base is not harmful. However, the normality of the alkali metal base should be at least 5 normal since alkali metal bases having a normality of less than about 5 normal require excessive amounts of times, sometimes as long as 24 hours or more, to hydrolyze the ester groups in the polymeric acetal carboxylate to the corresponding alkali metal salt. Furthermore, when the alkali metal base has a normality of at least 5 normal, the polymeric acetal carboxylate salt will precipitate, making recovery of the desired alkali metal salt far easier. It is preferred to use an alkali metal base having a normality above at least 5 normal, say at least 10 normal, or even higher. Using these normalities of an alkali metal base, the saponification of the ester groups in the polymeric acetal carboxylate to the corresponding alkali metal salt is complete in less than 2 hours, and the polymeric salt precipitates, making it readily recoverable by conventional techniques such as filtration, centrifugation, decantation and the like.

The polymeric acetal carboxylate ester can be brought together in the reaction zone with a sufficient amount of the alkali metal base under a wide range of temperatures and pressures. For example, the pressure can vary from subatmospheric pressure to superatmospheric pressure, although there is not a particular advantage to using subatmospheric pressure or superatmospheric pressure since satisfactory results are obtained at atmospheric pressure. The temperature can vary from 0° to about 50° C., or even higher, but there does not seem to be a particular advantage to using temperatures below room temperature or in excess of about 50° C., since satisfactory results can be obtained at temperatures between room temperature (about 20° C.) and about 45° C.

In the preferred embodiment of the present invention, the polymeric acetal carboxylate ester that has been stabilized against rapid depolymerization in alkaline solution is contacted with a solvent that is immiscible with the polymeric ester to remove impurities that produce a brown color in the salt after the ester is brought together in a reaction zone with the alkali metal base. Although the brown color in the salt can be removed by dissolving the salt in a minimum amount of water, and thereafter precipitating the salt using a water miscible solvent, such as methanol, ethanol and the like, the procedure is not efficient since it must be repeated as many as five or six times to provide a white salt. By the present process, the polymeric ester can be contacted with the solvent to remove the color-producing impurities and thereafter the solvent can be separated from the polymeric ester, which is then brought together in a reaction zone with the alkali metal base to provide a white salt.

The solvent can be any number of materials known to those skilled in the art and can be aromatic, alicyclic or aliphatic. It is only necessary that the solvent (1) does not react with the starting materials or the finished product, (2) is effective in removing the color-producing impurities from the polymeric ester, and (3) is immiscible with the polymeric ester, i.e., the polymeric ester is essentially insoluble in the solvent. Suitable aromatic compounds include benzene, toluene, xylene, ethyl benzene, isopropyl benzene, diethyl benzene and the like. Suitable aliphatic compounds include compounds containing from about 4 to about 20 carbon atoms, which can be saturated or unsaturated, such as butane, hexane, petroleum ether, octane, pentene, heptene, nonene and the like. Satisfactory results can be obtained with ethers containing 3 to 20 carbon atoms, such as diethyl ether, methylethyl ether and the like. It is preferred that the aliphatic compound contains from about 4 to 10 carbon atoms and it is even more preferred when the solvent is a mixture of an aromatic compound and an aliphatic compound containing from about 4 to 20 carbon atoms, particularly when the aromatic compound and aliphatic compound are in a weight ratio of about 1:1, say between about 1:3 and about 3:1. A solvent mixture of benzene and hexane in this concentration range provides unusually good results, although other mixtures of solvents such as hexane and diethyl ether, or petroleum ether and diethyl ether, also provide satisfactory results.

The ratio of solvent to polymeric ester can vary within wide ranges. As little as 1 milliliter of solvent per 5 grams of polymeric ester can be used, or even less although most of the colored impurities may not be removed when using such small amount of solvent. On the other hand, there is no upper limit to the amount of solvent that can be used, although the use of more than about 5 milliliters of solvent per gram of polymeric ester does not seem to be advantageous. It is preferred to use from about 1 milliliter to about 3 milliliters of solvent per gram of polymeric acetal carboxylate ester.

The polymeric salts of the present invention are useful as builders in detergent formulations. Since the pH of a detergent solution is usually between pH 9 and pH 10, the polymer of the present invention will not depolymerize rapidly when used as a detergent builder in aqueous solution at normal use concentrations, temperatures and times typical of United States home laundry practices. The detergent formulations will contain at least 1 percent by weight and preferably at least 5 percent by weight of the polymeric salt. In order to obtain the maximum advantages of the polymeric salts as builders, the detergent should preferably contain from about 5 percent to about 75 percent of these salts. The polymeric salts can be the sole detergency builder, or these polymeric salts can be utilized in combination with other detergency builders which may constitute from 0 to 95 percent by weight of the total builders in the formulation. The amount and choice of builder, surfactant and other detergent ingredients, such as optical brighteners, fillers, bleaches, dyes, soil anti-redeposition agents, perfumes and the like, will be in accordance with well understood practices of detergent formulation.

DESCRIPTION OF THE PREFERRED EMBODIMENTS

This invention is illustrated by but not limited to the following examples wherein all percentages are by weight unless otherwise noted.

Example I

To a 500 milliliter single-necked round bottom reaction flask equipped with a magnetic stirrer, 100 grams (1.1 moles) of freshly distilled methyl glyoxylate and 40 milliliters of methylene chloride were added. The temperature of the flask and the contents was lowered to about 0° C. and 5 milliliters of 0.05 molar sodium diethyl methylmalonate was added to initiate polymerization. The flask was kept in an ice bath and when the temperature returned to 0–2° C. (about 45 minutes) two milliliters of trifluoroacetic acid (1.5 mole percent) and 35 milliliters of ethyl vinyl ether was added to the mixture. The mixture was stirred at room temperature overnight.

The following morning the reaction mixture was treated with 200 milliliters of a 1:1 mixture by volume of benzene and hexane. The contents were stirred vigorously for about 1 minute and the layers were then allowed to separate. The bottom, nearly water-white layer containing the polymeric acetal carboxylate ester was separated from the solvent. The benzene/hexane mixture containing the color-producing impurities was discarded.

To the polymeric acetal carboxylate ester cooled to 0° C. in an ice bath was then added 120 milliliters of 10 molar sodium hydroxide with vigorous stirring. The heat of reaction raised the temperature to about 45° C. Stirring was continued for about one hour. The white polymeric acetal carboxylate sodium salt precipitated and was recovered by filtration. The precipitate was washed once with diethyl ether and dried. The yield was 73 percent.

Example II

To a 1,000 milliliter three-necked flask equipped with a mechanical stirrer and thermometer was added 141.5 g (1.61 moles) of freshly distilled methyl glyoxylate and 33 milliliters of anhydrous methylene chloride. The mixture was cooled in an ice bath and polymerization initiated by addition of 6 milliliters of a 0.05 molar solution of sodium diethyl methylmalonate in tetrahydrofuran. Polymerization was rapid and exothermic, the temperature rising to about 55° C. Stirring and cooling were continued until the mixture cooled to 0–2° C. (about 1 hour). At this point, 2.4 milliliters (0.032 mole, 2.0 mole percent) of trifluoroacetic acid was added followed by 46 milliliters (0.48 mole, 0.3 equivalents) of ethyl vinyl ether. The mixture was kept in an ice bath an additional 45 minutes, then allowed to warm to room temperature and stirred overnight.

Toluene (150 milliliters) was added and the mixture vigorously stirred for 10 minutes. The upper solvent layer was removed by decantation and the washing repeated with a second 150 milliliter portion of toluene. After the second portion had been decanted, the ester polymer was treated with 35 milliliters of 1.0 molar sodium hydroxide to neutralize any remaining trifluoroacetic acid, and 150 milliliters of 0.1 molar sodium hydroxide was added to remove unreacted monomer and polymer that was not stabilized against rapid depolymerization in alkaline solution. After stirring for 20 minutes, the aqueous layer was decanted.

The polymeric ester was then saponified with 160 milliliters of 10 molar sodium hydroxide. The base is added in portions while the reaction mixture is cooled in ice to keep the temperature of the mixture below about 45° C. Addition of base required about 30 minutes and the mixture was stirred an additional 90 minutes to insure complete reaction.

Methanol (300 milliliters) was added to facilitate filtration and the polymeric sodium salt was filtered on a sintered glass funnel and washed with methanol and ether. Vacuum drying overnight at 50° C. and 2–3 milliliters of mercury left 146.8 grams (87 percent yield) of a white solid product.

The salt was further purified by dissolving the salt in water (600 milliliters) and adding the aqueous solution to 6 liters of methanol. Filtration, washing and drying gave 84 percent recovered product for an overall yield of 73 percent.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. As an example, other polymeric ether carboxylates, such as a copolymer of an acetal carboxylate and ethylene oxide, or a copolymer of an acetal carboxylate and formaldehyde, and the like, can be used in the process of the present invention with substantially equivalent results, and the use of such polymeric ether carboxylates in lieu of the polymeric acetal carboxylates described in the examples and elsewhere in the specification are deemed to be equivalent in the process of the present invention. Accordingly, modifications are contemplated which can be made without departing from the spirit of the described invention.

What is claimed is:

1. In a process for saponifying a polymeric acetal carboxylate ester to a polymeric acetal carboxylate salt, the improvement which comprises bringing together in a reaction zone the polymeric acetal carboxylate ester and a sufficient amount of an alkali metal base having a normality of at least 5 normal to saponify at least 50 percent of the ester groups.

2. In a process of claim 1 wherein the amount of alkali metal base is sufficient to saponify at least 80 percent of the ester groups.

3. In a process of claim 1 wherein the amount of alkali metal base is sufficient to saponify at least 95 percent of the ester groups.

4. In a process of claim 3 wherein the amount of alkali metal base is a stoichiometric excess over that required to saponify at least 95 percent of the ester groups.

5. In a process of claim 1 wherein the normality of the alkali metal base is at least 10 normal.

6. In a process of claim 1 wherein the alkali metal base is sodium hydroxide.

7. In a process of claim 1 wherein the ester is contacted with an immiscible solvent and thereafter brought together in a reaction zone with the alkali metal base.

8. In a process of claim 7 wherein the solvent is an aromatic compound.

9. In a process of claim 7 wherein the solvent is toluene.

10. In a process of claim 7 wherein the solvent is an aliphatic compound containing from about 4 to about 20 carbon atoms.

11. In a process of claim 7 wherein the solvent is an aliphatic compound containing from about 4 to about 10 carbon atoms.

12. In a process of claim 7 wherein the solvent is a mixture of an aromatic compound and an aliphatic compound containing from about 4 to about 20 carbon atoms.

13. In a process of claim 12 wherein the weight ratio of aromatic compound to aliphatic compound is between about 1:3 and about 3:1.

14. In a process of claim 13 wherein the aromatic compound is benzene.

15. In a process of claim 14 wherein the aliphatic compound contains from about 4 to about 10 carbon atoms.

16. In a process of claim 14 wherein the aliphatic compound is n-hexane.

17. In a process of claim 14 wherein the alkali metal base is sodium hydroxide.

* * * * *